(12) United States Patent
Menez

(10) Patent No.: US 7,315,881 B2
(45) Date of Patent: Jan. 1, 2008

(54) SCHEDULER APPARATUS EMPLOYING A GOPHER AGENT THAT SENDS E-MAIL MESSAGES FOR USE IN A TELEVISION RECEIVER

(75) Inventor: Benoit Pol Menez, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 938 days.

(21) Appl. No.: 09/748,952

(22) Filed: Dec. 27, 2000

(65) Prior Publication Data

US 2002/0083139 A1    Jun. 27, 2002

(51) Int. Cl.
*G06F 15/16* (2006.01)
(52) U.S. Cl. ............... 709/206; 348/569; 725/9
(58) Field of Classification Search ......... 725/9–11, 725/40, 105; 709/206; 348/569
See application file for complete search history.

(56) References Cited

U.S. PATENT DOCUMENTS

| | | | | |
|---|---|---|---|---|
| 5,465,385 A | * | 11/1995 | Ohga et al. | 725/58 |
| 5,550,575 A | * | 8/1996 | West et al. | 725/28 |
| 5,940,073 A | * | 8/1999 | Klosterman et al. | 345/721 |
| 6,144,401 A | * | 11/2000 | Casement et al. | 725/30 |
| 6,215,483 B1 | * | 4/2001 | Zigmond | 725/112 |
| 6,263,501 B1 | * | 7/2001 | Schein et al. | 725/39 |
| 6,396,546 B1 | * | 5/2002 | Alten et al. | 348/569 |
| 6,421,067 B1 | * | 7/2002 | Kamen et al. | 345/719 |
| 6,424,791 B1 | * | 7/2002 | Saib | 386/83 |
| 6,577,350 B1 | * | 6/2003 | Proehl et al. | 348/564 |
| 6,591,292 B1 | | 7/2003 | Morrison et al. | |
| 6,637,029 B1 | * | 10/2003 | Maissel et al. | 725/46 |
| 2002/0138834 A1 | * | 9/2002 | Gerba et al. | 725/42 |

* cited by examiner

*Primary Examiner*—Krisna Lim
(74) *Attorney, Agent, or Firm*—Joseph J. Laks; Harvey D. Fried; Joel M. Fogelson

(57) ABSTRACT

In a television system in which at least program title information for programs which are to be transmitted in the future is transmitted in advance to form a channel guide listing, apparatus is provided for searching the listing for specific user-entered information, and upon successful conclusion to the search, the apparatus schedules the tuning of the desired program, or in the alternative, notifies the viewer of the availability of the program by sending an e-mail message to an address provided by the viewer. In those instances where descriptive text accompanies the program listing, apparatus of the invention performs a search of the text for a particular text string which may relate to the title, the star, the director, or the context of the program, among other search criteria.

11 Claims, 9 Drawing Sheets

| CH 150 | PROGRAM GUIDE | | | 7:05 PM |
|---|---|---|---|---|
| | 7:00 PM | 7:30 PM | 8:00 PM | 8:30 PM |
| HBO 102 | OTHER PEOPLE'S MONEY | | FREE PREVIEW | DREAM ON |
| CBS 106 | EVENING NEWS | HOME IMPROVEMENT | BROOKLYN BRIDGE | RAVEN |
| UPN 113 | STAR TREK: VOYAGER | | ENTERTAINMENT TONIGHT | WORLD NEWS |
| CINE 210 | EYEWITNESS | FUN CITY | | DOUBLE TROUBLE |
| CNN 305 | PRIME NEWS | BOTH SIDES | RELIABLE SOURCES | HOME AND GARDEN |
| USA 422 | COUNTER STRIKE | | QUANTUM LEAP | |
| HOME | MOVIES | SPORTS | OTHER | ALL | EXIT |

ENTER ALL OR PART OF PROGRAM NAME TO SEARCH: HOME

FIG. 1a

| CH 150 | PROGRAM GUIDE | | | 7:05 PM | |
|---|---|---|---|---|---|
| | 7:00 PM | 7:30 PM | 8:00 PM | 8:30 PM | |
| HBO 102 | OTHER PEOPLE'S MONEY | | FREE PREVIEW | DREAM ON | |
| CBS 106 | EVENING NEWS | HOME IMPROVEMENT | BROOKLYN BRIDGE | RAVEN | |
| UPN 113 | STAR TREK: VOYAGER | | ENTERTAINMENT TONIGHT | WORLD NEWS | |
| CINE 210 | EYEWITNESS | FUN CITY | | DOUBLE TROUBLE | |
| CNN 305 | PRIME NEWS | BOTH SIDES | RELIABLE SOURCES | HOME AND GARDEN | |
| USA 422 | COUNTER STRIKE | | QUANTUM LEAP | | |
| HOME | MOVIES | SPORTS | OTHER | ALL | EXIT |
| HOME FOUND. PRESS MENU AGAIN TO FIND ANOTHER OCCURRENCE | | | | | |

FIG. 1b

| CH 150 | PROGRAM GUIDE | | | 7:05 PM |
|---|---|---|---|---|
| | 7:00 PM | 7:30 PM | 8:00 PM | 8:30 PM |
| HBO 102 | OTHER PEOPLE'S MONEY | | FREE PREVIEW | DREAM ON |
| CBS 106 | EVENING NEWS | HOME IMPROVEMENT | BROOKLYN BRIDGE | RAVEN |
| UPN 113 | STAR TREK: VOYAGER | | ENTERTAINMENT TONIGHT | WORLD NEWS |
| CINE 210 | EYEWITNESS | FUN CITY | | DOUBLE TROUBLE |
| CNN 305 | PRIME NEWS | BOTH SIDES | RELIABLE SOURCES | HOME AND GARDEN |
| USA 422 | COUNTER STRIKE | | QUANTUM LEAP | |
| HOME | MOVIES | SPORTS | OTHER | ALL | EXIT |

HOME FOUND. PRESS MENU AGAIN TO FIND ANOTHER OCCURRENCE

FIG. 1c

| TITLE | TOPIC | THEME | KEYWORD | ACTION | TIME |
|---|---|---|---|---|---|
| STAR TREK | | | | REMIND | ALWAYS |
| THE SHINING | | | | RECORD | ALWAYS |
| | MOVIES | DRAMA | | REPORT | NOW |
| | | | ROBOT | E-MAIL REMINDER TO XXXX@TCE.COM | ALWAYS |
| | | | | | |

FIG. 5

SCHEDULER APPARATUS EMPLOYING A GOPHER AGENT THAT SENDS E-MAIL MESSAGES FOR USE IN A TELEVISION RECEIVER

FIELD OF THE INVENTION

The subject invention concerns a method and apparatus for capable of sending an email including the selection of a television program for watching or recording at some future date.

BACKGROUND OF THE INVENTION

The programming of modern television systems, such as TV schedulers, VCRs, and Satellite Receivers has become more complicated in that the number of available channels has increased dramatically of late. For example RCA® DSS® direct broadcast satellite receivers provide as many as 150 channels to choose from. Heretofore, a user who wanted to record a specific non-regularly scheduled television program such as the airing of a particular movie, would regularly consult a television schedule printed in his local newspaper in the hope that he would eventually find that movie listed.

Such a practice may work well when there are only a few television channel schedules to examine, however, it is unlikely that a viewer would be able to examine the complete schedules for 150 television channels each week. Such a task would be daunting even if all of the movies were to be listed separately, as some television program listings do. Consequently, it is felt that as the number of channels increases, the chances of successfully locating a single occurrence of a program (like a needle in a haystack) becomes more and more unlikely.

SUMMARY OF THE INVENTION

In a television system in which at least program title information for programs which are to be transmitted in the future is transmitted in advance to form a channel guide listing, apparatus is provided for searching the listing for specific user-entered information, and upon successful conclusion to the search, the apparatus schedules the tuning of the desired program, or in the alternative, notifies the viewer by on-screen display and/or by sending an e-mail message regarding the availability of the program. In those instances where descriptive text accompanies the program listing, apparatus of the invention performs a search of the text for a particular text string which may relate to the title, the star, the director, or the context of the program, among other search criteria.

BRIEF DESCRIPTION OF THE DRAWING

FIGS. 1a–1c are illustrations of a screen display of a portion of a channel guide, in accordance with one aspect of the invention.

FIG. 5 is an illustration of a search request list in accordance with the subject invention.

DETAILED DESCRIPTION OF THE INVENTION

Television systems such as the RCA® DSS® direct broadcast satellite system and Starsight® transmit channel guides for display on the television receivers of subscribers.

FIGS. 1a–1c show Program Guide screen displays produced, for example, by an RCA® DSS® direct broadcast satellite receiver system, manufactured by Thomson Consumer Electronics, Inc. Indianapolis, Ind. A user selects a television program from a Program Guide for viewing, by moving a cursor (via operation of remote control up, down, right, and left, direction control keys, not shown) to a block of the program guide screen display which contains the name of the desired program. When a SELECT key on the remote control is pressed, the current x and y position of the cursor is evaluated to derive virtual channel and program time information. In this example of FIG. 1a, a particular television show, EVENING NEWS has been highlighted for selection by use of the cursor keys on a remote control unit (e. g., 450R of FIG. 4). The highlighting is illustrated by the dark box outlining the title in FIGS. 1a–1c. Normally, upon pressing the SELECT key, the relevant programming data is transferred to a programming unit.

However, note the phrase "ENTER ALL OR PART OF A PROGRAM NAME TO SEARCH" which appears at the bottom of FIG. 1a. In this case the word "HOME" has been entered by a user. Upon pressing the MENU key, a search of the channel guide information is performed for the next occurrence of a television program including the word "HOME" in its title. At the completion of the search, the screen display of FIG. 1b is generated. Note that a television program on channel 106 entitled "HOME IMPROVEMENT" is now highlighted. If desired, a further search can be initiated by pressing the MENU key again. The result of that further search is shown in the screen display of FIG. 1c. Note that in FIG. 1c, a television program on channel 305, "HOME AND GARDEN" is highlighted, because that title includes the word "HOME", and thus satisfies the search criteria. The subject apparatus can also perform "substring searching" wherein the keyword (search term) is contained within another word. For example, a substring search on the word HOME would find the movie title "HOMEWARD BOUND". Similarly, the search can be made case sensitive, or case insensitive, as desired.

Figure 2:
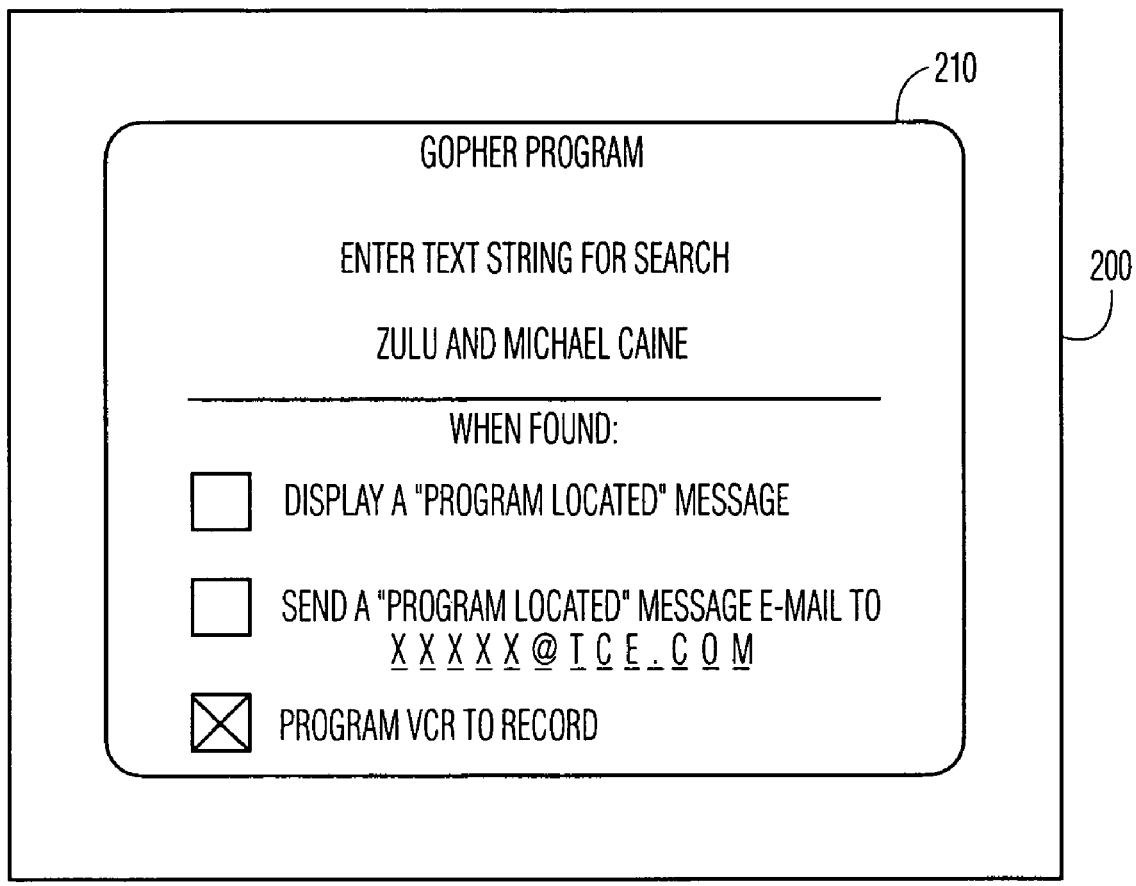
FIG. 2 is an illustration of a screen display showing a search request screen in accordance with another aspect of the invention.

FIG. 2 shows a "GOPHER PROGRAM" screen display 210 useful for entering text to be searched, and for entering instructions to be executed in the event that the search is terminated. The search entered on screen display 210 will perform the logical "AND" function on the search terms "ZULU" (a movie title) and "MICHAEL CAINE" (one of ZULU'S stars). While a logical "AND" function is shown, logical "OR" and "NOT" functions are also envisioned. In fact, a logical "OR" function could simply be performed by entering the search terms as two different searches. That is, if the search term "ZULU" were entered by itself, the movie "ZULU" AND any television program concerning the ZULU tribe would be selected. If the search term "MICHAEL CAINE" were entered as a separate search, the movie "ZULU" and any other movie starring Michael Caine would be selected.

Note from screen display 210, that when the movie "ZULU" is found, it is to be recorded. That is, after entering the search terms and instructions via screen display 210, the user does not have to perform any further function (other than ensuring that the VCR has a tape in it) to secure a recording of the movie "ZULU" whenever it is aired. At the proper time the apparatus of the invention will transmit the record commands to the VCR, automatically. Alternatively, the user may have checked the box labeled DISPLAY A "PROGRAM LOCATED" MESSAGE, and/or checked the box labeled SEND "A PROGRAM LOCATED" E-MAIL to send an e-mail message to an e-mail address or addresses entered by the user in an on-screen window provided for such purpose. If either of these boxes are checked, then the show will not be recorded, but rather a reminder will be displayed on-screen and/or e-mailed to an e-mail recipient, respectively, indicating that the search has successfully terminated upon finding the requested item.

The e-mail message can be sent to any web-enabled TV, computer, phone, digital personal assistant such as a Palm Pilot, or any other device able to receive and display such communications. Since a user may not always be able to access the satellite receiver to see if a program has been found, and since a user is likely to check their e-mail more frequently then the satellite receiver, the ability to receive such e-mail messages is of great convenience to the user. The e-mails can be sent over a wireless communications system such as the RCA® DSS® direct broadcast satellite system shown in FIG. 4, or over telephone lines, cable lines, digital subscriber lines, etc.

Figure 3:
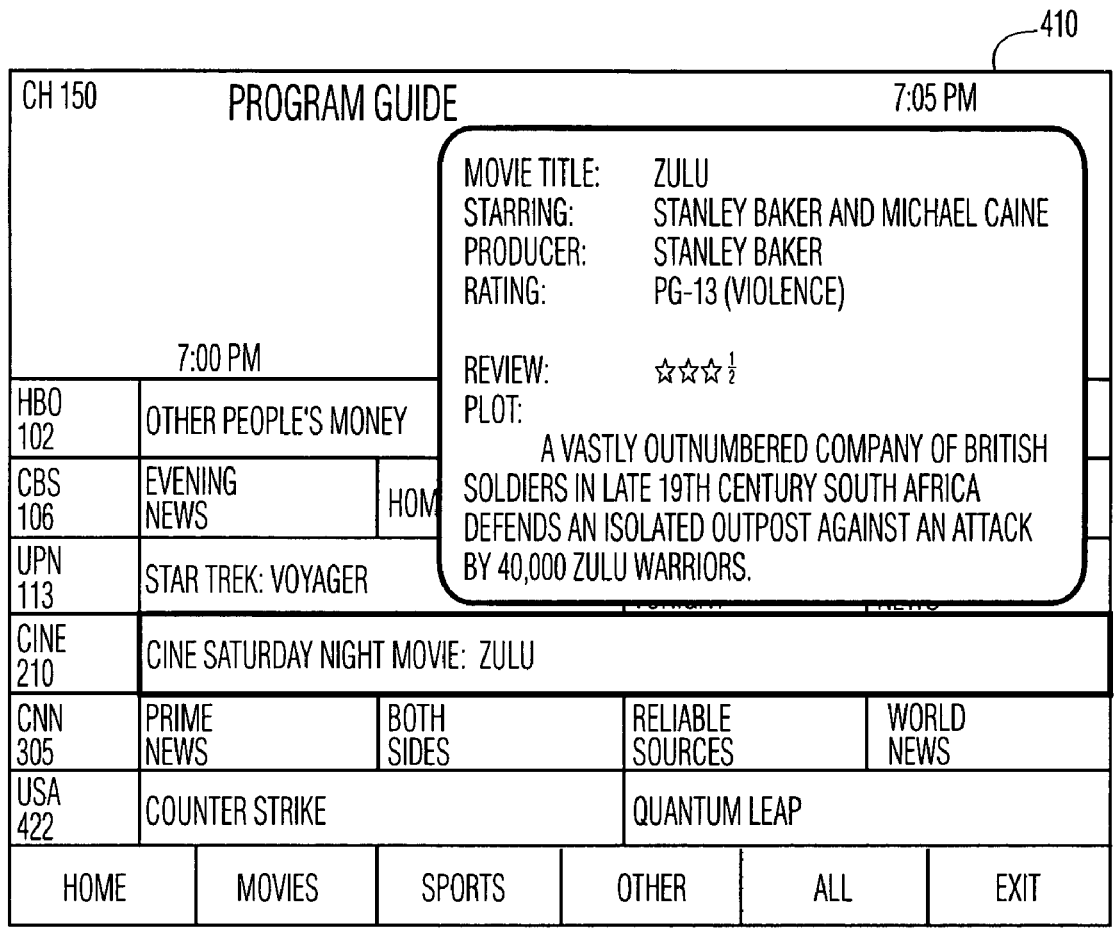
FIG. 3 is an illustration of a screen display of a portion of a channel guide showing auxiliary program information.

FIG. 3 shows a Program Guide screen 310, including an auxiliary information display 320. The text of auxiliary display 320 includes the search terms "ZULU" and "MICHAEL CAINE" in the program description. This text will be searched by the GOPHER PROGRAM and the search will come to a successful conclusion. Note that a search of "ZULU" and "STANLEY BAKER" would have been equally successful. It is important to note that not only is the Program Guide text, but also the auxiliary information associated with the television programs, is being searched.

Figure 4:
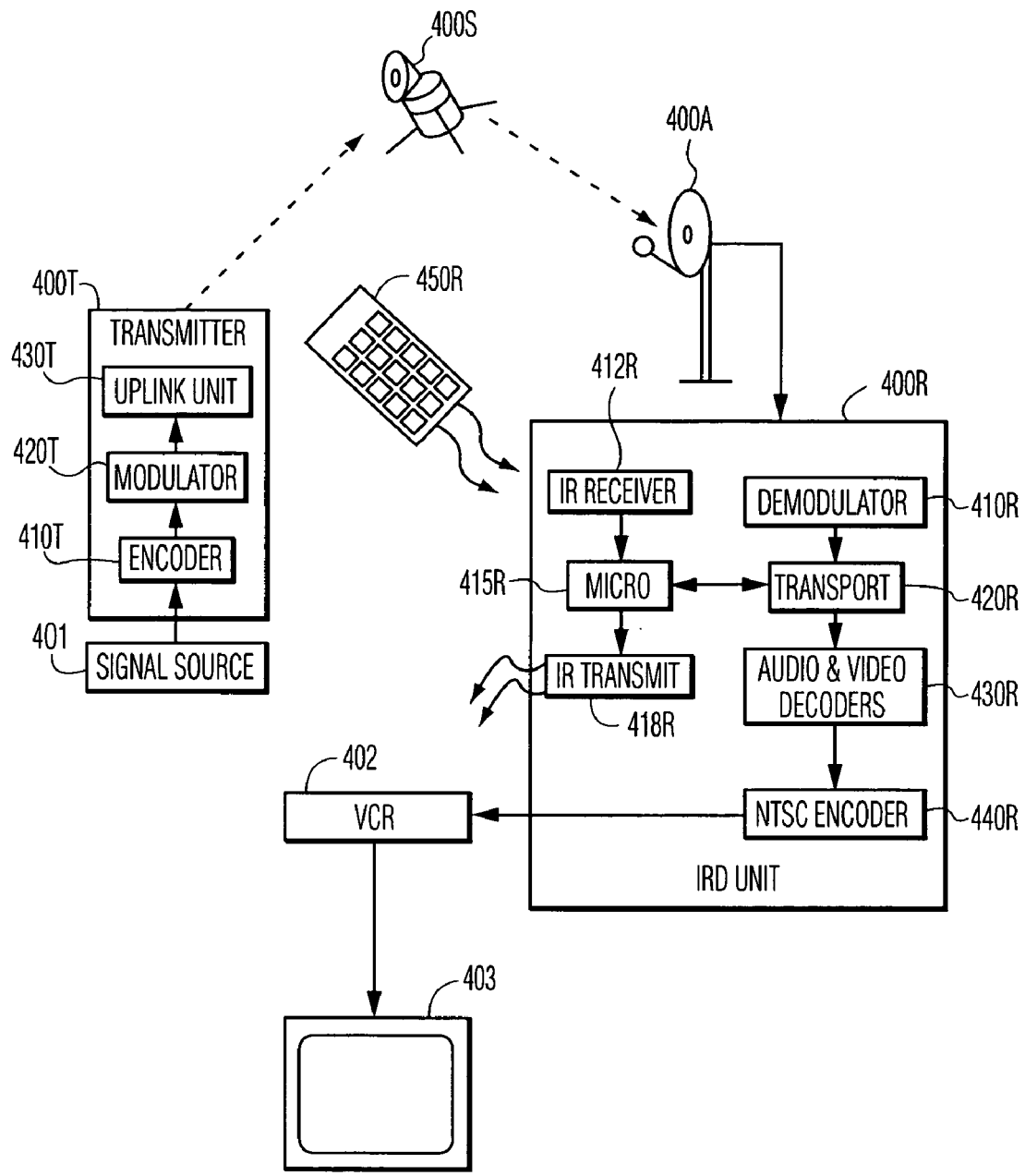
FIG. 4 is an illustration in block diagram form of apparatus suitable for use with the invention.

As noted above, the channel guide data used by the controller of the subject apparatus to form the above-described interactive or confirmation sentences may be received from a satellite television communication system. FIG. 4 shows such a satellite television communication system in which, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a downlink portion (satellite to earth) including a receiver located at the user's residence.

In such a satellite system, the information necessary to select a given television program is not fixedly-programmed into each receiver but rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because the receiver (IRD, or Integrated Receiver Decoder) literally does not know where any channel is located, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412 for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Similarly, microprocessor 415R is used to store e-mail addresses and to send e-mail messages to a user. Microprocessor 415R also receives and interprets cursor key X and Y information in order to control the highlighting of user choices in the on-screen displays.

FIG. 5 shows a search request list which may be displayed as a screen display. In this embodiment of the invention, five actions are possible. First, as noted above, a show may be programmed to be recorded at its next airing without further intervention by the user. Second, as noted above, a reminder can be displayed on-screen that the desired program has been found. Third, a report listing various programs meeting the search criteria and airing in the immediate future (for example, the next three hours) can be prepared and displayed. Fourth, a reminder e-mail message can be sent to the user at an e-mail address or addresses provided by the user. Fifth, a report listing various programs meeting the search criteria and airing in the immediate future (for example, the next three hours) can be prepared and e-mailed to the user at an e-mail address or addresses provided by the user.

In the example of FIG. 5, the user has requested that he be reminded anytime an episode of Star Trek appears in the Program Guide. The user has also requested that the movie "The Shining" be recorded the next time it is found in the guide. The user has also requested that he be reminded by an e-mail message sent to the address he specified anytime the word "robot" appears in the guide or in the program descriptions of the guide. These instructions will run until turned off by the user.

The remaining search (i.e., movie, drama, now) is a request which indicates that the user wants to know which dramas are being aired in the immediate future (i.e., within the next three hours). The controller will prepare a report listing all dramatic movies on all channels which are being broadcast in the next few hours. After doing so, this entry will be automatically deleted. It is further envisioned that a user may review and edit or delete search terms in order to modify on-going searches.

Figure 6:
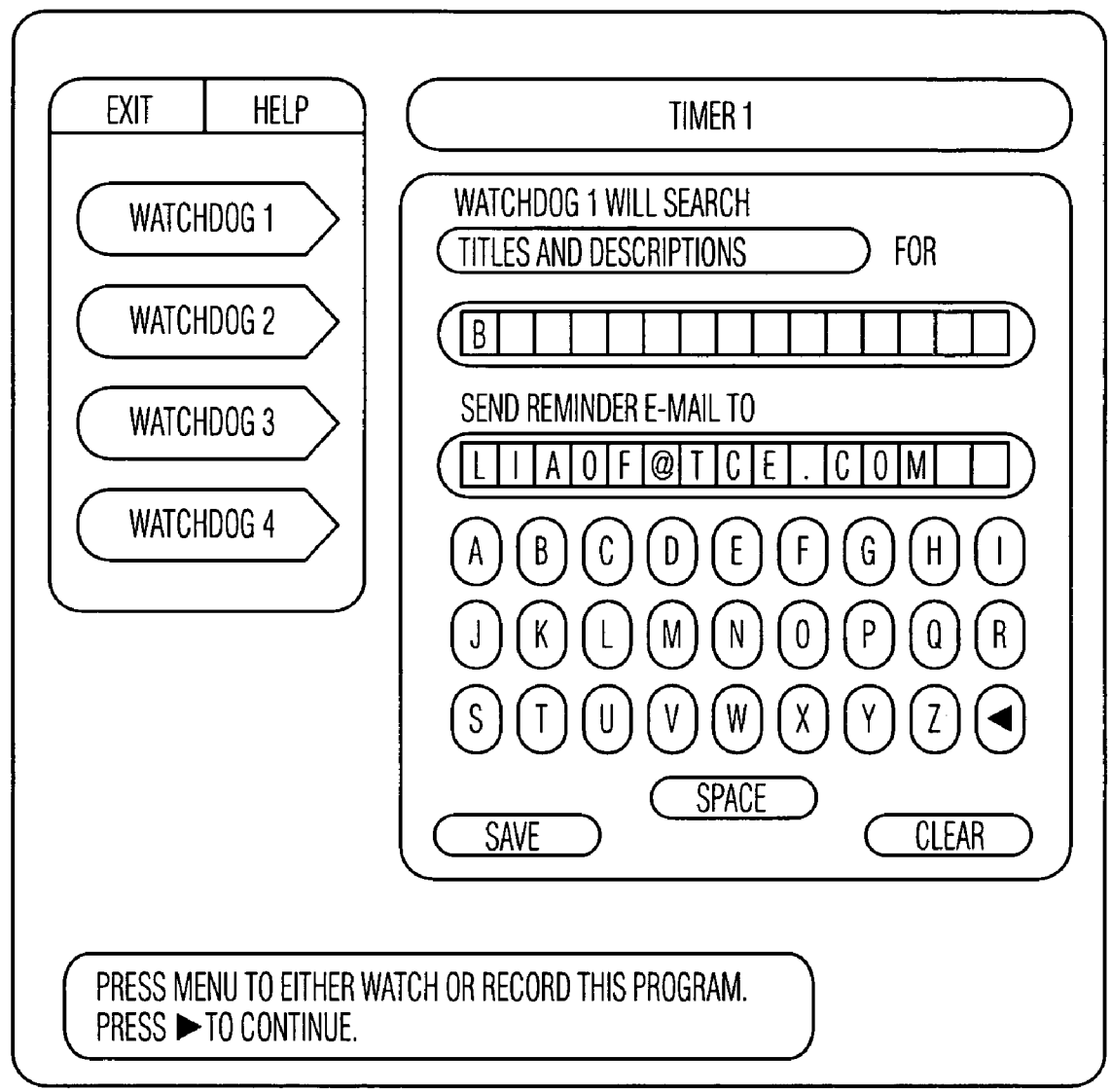
FIG. 6 is an illustration of a screen display useful for entering text search phrases in accordance with the invention.

FIG. 6 shows a screen display of a "virtual keyboard" useful for entering: search data; instructions, such as record a program or e-mail a reminder; and an e-mail address or addresses to which a reminder or report is to be sent. Four "Search Gophers" called "Watchdogs" are programmable for performing simultaneous searches of the Program Guide and auxiliary information data streams. By using the CURSOR and SELECT keys, a user can "press" one of the watchdog buttons on the left of the screen to select it. He may then use the alphabet keys to enter his search request. (While not explicitly shown, alphanumeric keys are also envisioned). When the user is satisfied with the text of his search request, he may press the Save key to save the search terms for this watchdog search process. If he makes an error, he may delete the error with the CLEAR key.

Figure 7:
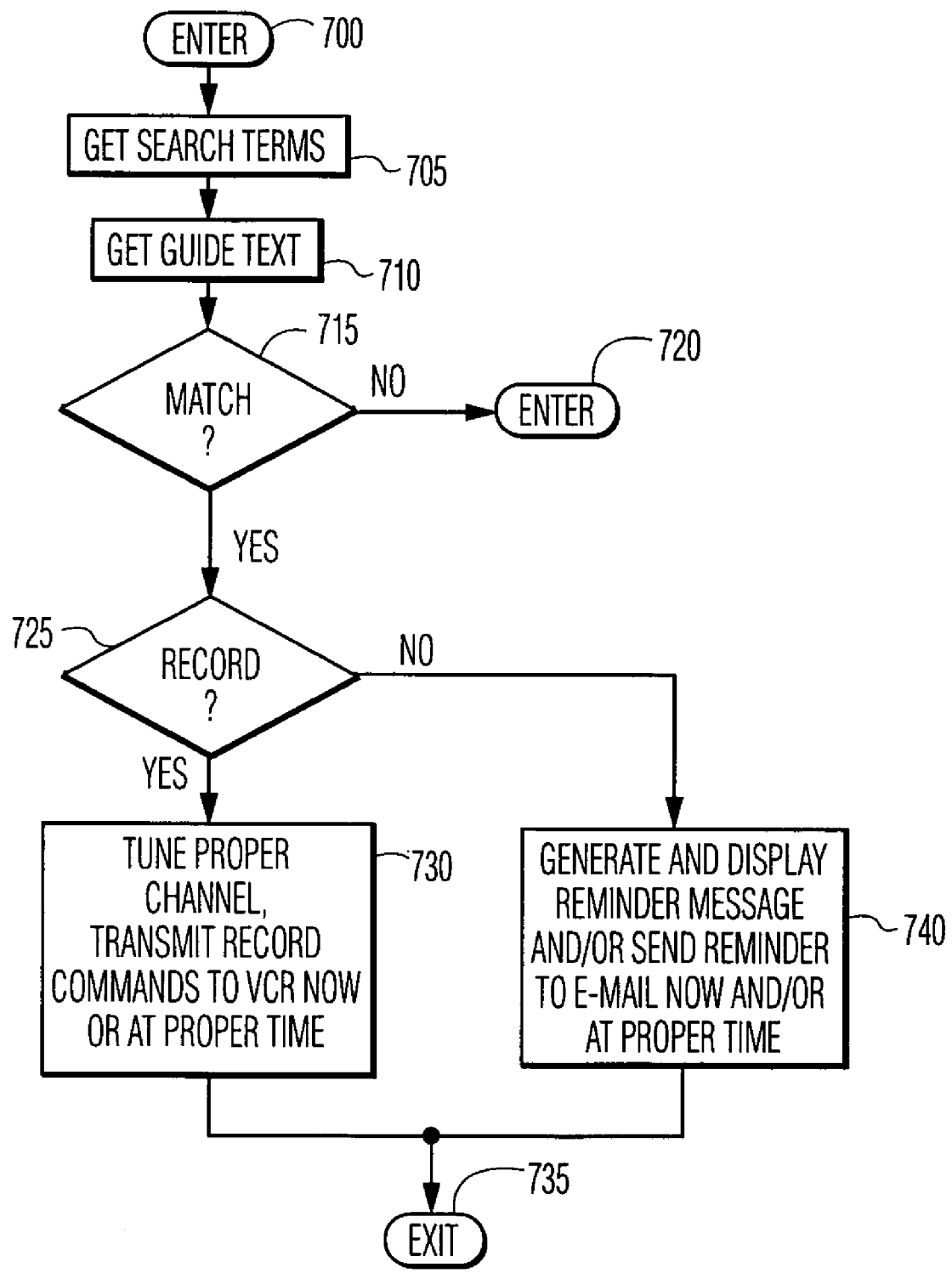
FIG. 7 is a flowchart useful in understanding the invention.

The Gopher program is entered at step 700 of FIG. 7. At step 705, the search terms are retrieved. At step 710, the Program Guide data is acquired. At step 715 a comparison is made to see if a match exists. If not the program is exited at step 720. If a match does exist, then the user-entered instructions are retrieved. A check is made at step 725 to determine if a record instruction has been entered, if so the routine advances to step 730 at which the record commands are transmitted to the VCR either immediately or at an appropriate later time. The routine is then exited at step 735. If however, a record instruction was not entered then the routine advances to step 740 at which a reminder message is generated for display on-screen or and/to be e-mailed to an address provided by the user (which may include the user's own e-mail address serving as a self reminder), either immediately or at an appropriate later time as a "last minute reminder" before the desired show is broadcast, or both. The routine is then exited at step 735.

Although the invention was described with reference to a satellite television system, it is equally applicable to ground based television broadcast systems, both digital and analog.

I claim:

1. In a television system in which at least program title information for programs which are to be transmitted in the future is transmitted in advance to form a channel guide list, apparatus comprising:

memory means for storing data representing said channel guide list, data representing program descriptive text, an e-mail address, and user-entered data representing a user entered text string which is used for searching said channel guide list and said program descriptive text;

data entry means for entering said user-entered data;

control means for performing a search of said channel guide listing and said program descriptive text to match said specific user entered information as to return at least two different program titles where said search term matches a term in the title of one program from said at least two different programs and said user entered information matches the descriptive text corresponding to a second program of said at least two different programs;

on-screen display means for displaying text or graphics under control of said control means; and means for selecting a television program for viewing;

said control means sends after said at least two different programs are determined an electronic message to the user at the e-mail address to notify said user of an availability of said at least two different television programs, wherein said control means further transmits to said e-mail address electronic messages comprising additional television programs listings different from said at least two television programs and where such additional television program listings are selected from updated program guide information that match at least one of: a program title of said additional television programs and program descriptive text of said additional television programs said until said search operation is terminated.

2. The apparatus of claim 1 wherein, when television program-descriptive text relates to at least one of a title, star, director, or context of said television program.

3. The apparatus of claim 2 wherein, in response to user-entered data said control means controls said on-screen display means to display a list of user-entered search criteria, and user-entered instructions for execution after successful completion of each search.

4. The apparatus of claim 3 wherein, said on-screen user-entered instructions for execution after successful completion of each search include instructions to record said at least two television programs.

5. The system of claim 1, wherein said electronic message is an e-mail message.

6. The apparatus of claim 1 further including a remote control unit wherein, said user-entered data is entered by means of a screen displayed keyboard operated by selecting keys of said keyboard via cursor commands transmitted by said remote control unit.

7. The apparatus of claim 1 wherein, said user-entered search criteria form logically-ORed search terms.

8. The apparatus of claim 1 wherein, said user-entered search criteria form logically-ANDed search terms.

9. The apparatus of claim 1 wherein, said user-entered search criteria form logical compound statements employing logic operators, such as AND, OR, NOT, or XOR to logically-connect search terms.

10. In a television system in which at least program title information for programs which are to be transmitted in the future is transmitted in advance to form a channel guide list, a television program searching method, comprising the steps of:

storing in a memory means data representing said channel guide list, data representing program descriptive text, an e-mail address, and storing user-entered data representing a user entered in text string which is used for searching said channel guide list and said program descriptive text;

performing a search of said channel guide listing and said program descriptive text to match said specific user entered information as to return at least two different television shows where said at least two different television programs have different program titles where said search term matches a term in the title of one of said at least two different programs and said user entered information matches a term of the descriptive text corresponding to a second program from said at least two different programs for a match to specific user-entered information; and sending an electronic message to a user at the e-mail address as to notify said user of an availability of said at least two different television programs, and repeating said sending step with further electronic messages comprising additional television programs listings which are different than said at least two different program listings and where said additional television program listings are selected from updated program guide information that match at least one of: a program title of said additional television programs and program descriptive text of said additional television programs, until said search operation is terminated.

11. The method of claim 10, wherein said user entered data is entered via a data entry means.

* * * * *

UNITED STATES PATENT AND TRADEMARK OFFICE
CERTIFICATE OF CORRECTION

PATENT NO. : 7,315,881 B2
APPLICATION NO. : 09/748952
DATED : January 1, 2008
INVENTOR(S) : Benoit Pol Menez Page 1 of 1

It is certified that error appears in the above-identified patent and that said Letters Patent is hereby corrected as shown below:

Col. 6, Line 50, after the word "programs" delete the word --said--.

Signed and Sealed this

Thirteenth Day of May, 2008

JON W. DUDAS
*Director of the United States Patent and Trademark Office*